Figure 1:
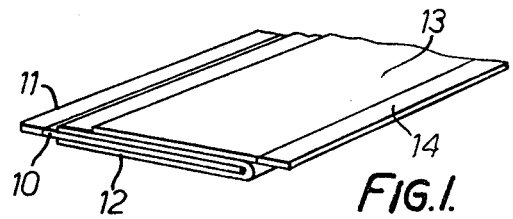

United States Patent [19]

Peters et al.

[11] 4,119,772

[45] * Oct. 10, 1978

[54] LEAD ACID CELLS AND BATTERIES

[75] Inventors: Kenneth Peters, Worsley; Sidney Fewster; Frank Wilson, both of Bolton; Kevin David Nicholas Kearney, Chobham, all of England

[73] Assignee: Chloride Group Limited, London, England

[*] Notice: The portion of the term of this patent subsequent to Oct. 11, 1994, has been disclaimed.

[21] Appl. No.: 825,471

[22] Filed: Aug. 17, 1977

Related U.S. Application Data

[63] Continuation of Ser. No. 626,778, Oct. 29, 1975, Pat. No. 4,053,695.

[30] Foreign Application Priority Data

Oct. 31, 1974 [GB] United Kingdom ............... 47470/74
May 23, 1975 [GB] United Kingdom ............... 22805/75

[51] Int. Cl.² ............................................. H01M 6/04
[52] U.S. Cl. ..................................... 429/204; 429/225
[58] Field of Search .......................... 429/204, 225–228, 429/247

[56] References Cited

U.S. PATENT DOCUMENTS

| 3,455,739 | 7/1969 | Field | 429/60 |
|---|---|---|---|
| 3,457,112 | 7/1969 | Reber | 429/58 |
| 3,647,543 | 3/1972 | Biddick | 429/55 |
| 3,795,543 | 3/1974 | Poe | 429/88 |
| 3,904,434 | 9/1975 | Sekido et al. | 429/59 |
| 3,953,236 | 4/1976 | Ito | 429/253 |

Primary Examiner—Charles F. Lefevour
Attorney, Agent, or Firm—Oblon, Fisher, Spivak, McClelland & Maier

[57] ABSTRACT

A sealed lead acid cell is disclosed which has electrodes comprising metallic supports which minimize the evolution of hydrogen and resist deformation under their own weight, and which are separated by at least one layer of separator material, the capacity of the negative electrodes is arranged to be at least as great as the capacity of the positive electrodes, the thickness of the electrodes is less than 3mm, the thickness of the separator is in the range of 10% to 200% of the thickness of the electrodes, and the volume, E, of electrolyte in the cell in relation to the sum of the pore volume of the separators, X, and the pore volume of the positive and negative active materials, Y, is not greater than 2X + Y.

19 Claims, 12 Drawing Figures

U.S. Patent  Oct. 10, 1978  Sheet 1 of 5  4,119,772

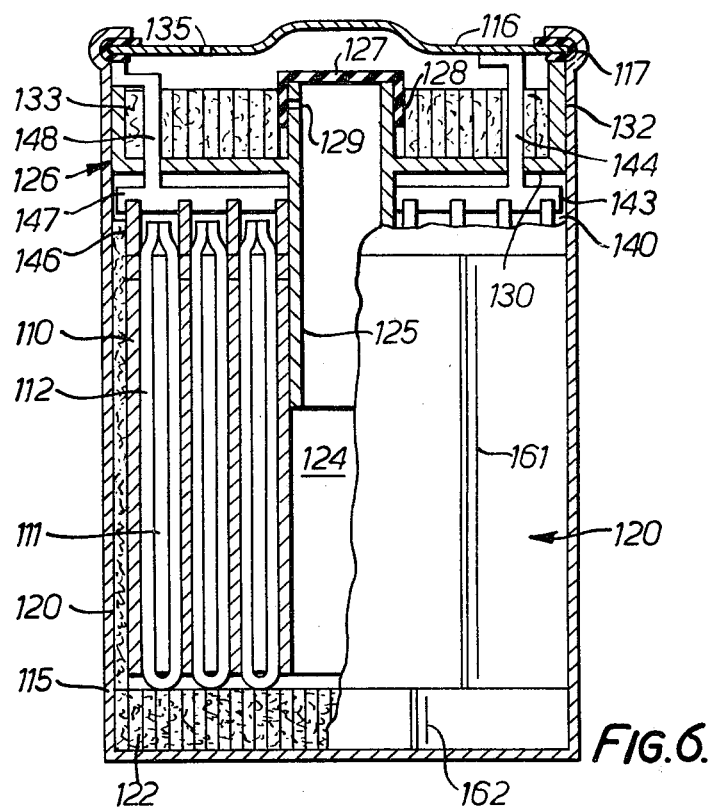
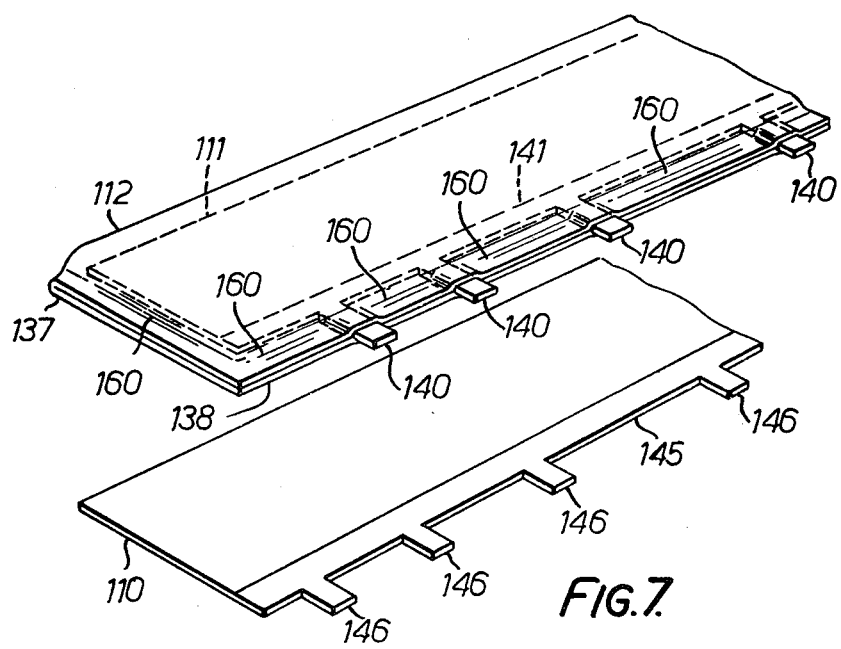

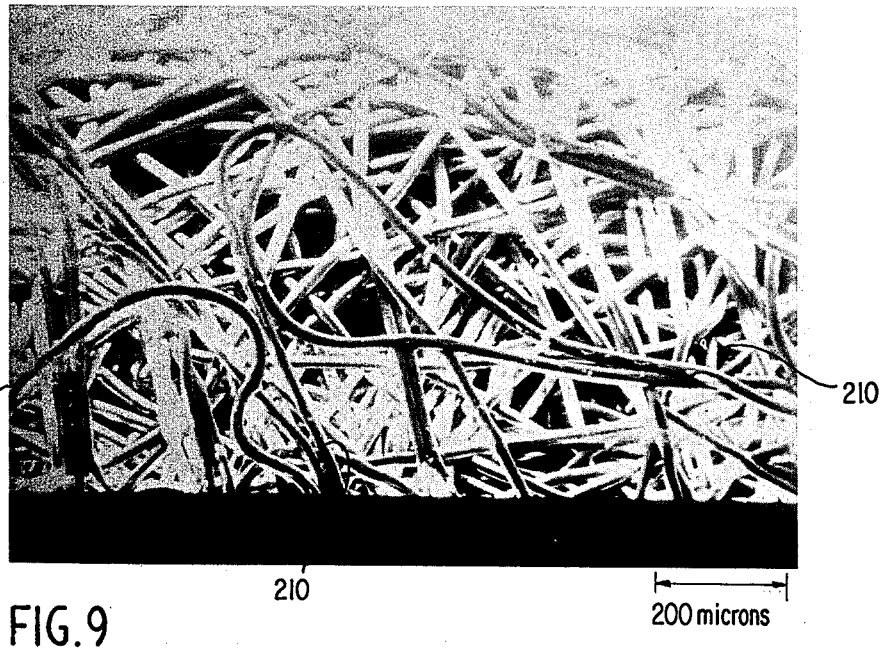
FIG.9    210    200 microns
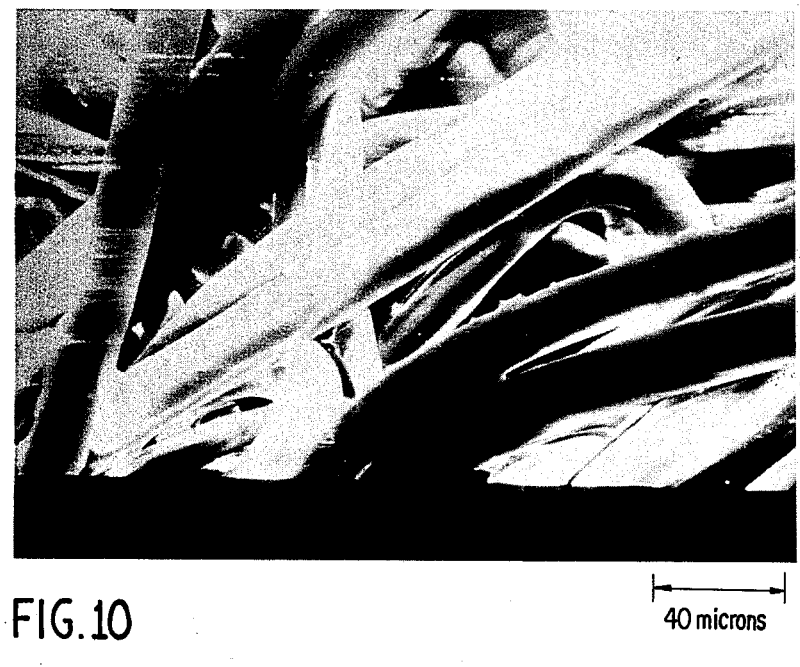
FIG.10    40 microns

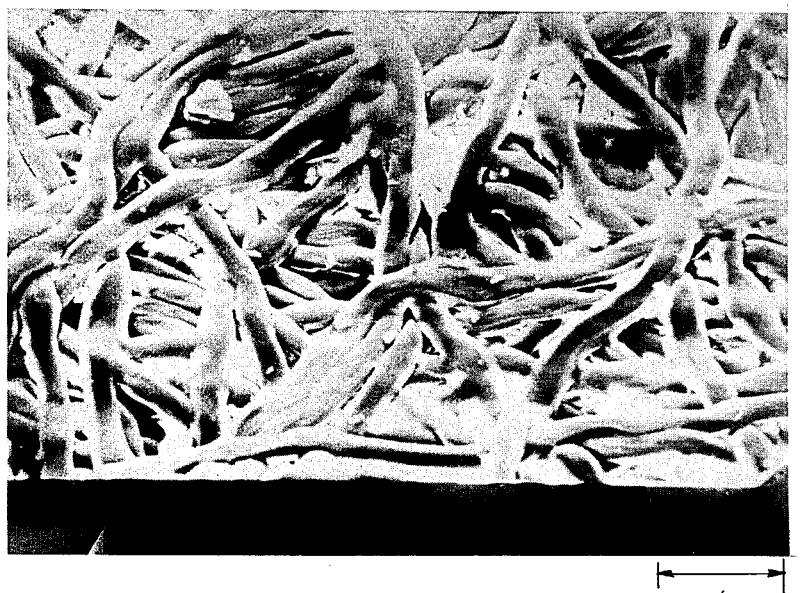
FIG.11     100 microns
FIG.12     40 microns

LEAD ACID CELLS AND BATTERIES

This is a continuation of application Ser. No. 626,778, filed Oct. 29, 1975 now U.S. Pat. No. 4,053,695.

The present invention relates to so called sealed lead acid electrochemical cells, and batteries made up from such cells.

So called sealed lead acid cells are supplied with their electrolyte content during manufacture and do not require to have electrolyte or water added during their lifetimes; such cells are usually referred to as sealed cells but in fact are usually provided with venting means so that in the event of excessive pressure build up occuring during certain phases of use, e.g., on overcharge, the excess gas can be vented to atmosphere and rupturing of the cell avoided.

Various proposals have been made for cells of this type but none are entirely free from problems.

The invention is not dependent on any particular cell geometry and is applicable both to wound cells and to prismatic cells. Wound cells have a single negative plate in the form of a long strip separated, by a long strip of porous electrically insulating separator material, from a single positive plate also in the form of a long strip. These are wound about an axis transverse to the length of the strip to form a compact interleaved electrode assembly.

Prismatic cells are formed from multiple numbers of separate positive and negative plates of square or rectangular forms separated by one or more sheets of separator material.

Thus according to the broadest aspect of the present invention a sealed lead acid cell as defined herein is characterised in that it has electrodes comprising metallic supports which minimize the evolution of hydrogen and resist deformation under their own weight, and which are separated by at least one layer of separator material, the support of the positive electrode or electrodes having positive active material deposited thereon and the support of the negative electrode or electrodes having negative active material deposited thereon, and in which the capacity of the negative electrodes is arranged to be at least as great as the capacity of the positive electrodes, the thickness of the electrodes is less than 3mm, the thickness of the separator is in the range of 10% to 200% of the thickness of the electrode, and the volume, E, of electrolyte in the cell in relation to the sum of the pore volume of the separators, X, and the pore volume of the positive and negative active materials, Y, is not greater than $2X+Y$.

The plates are made from a lead or lead alloy current conducting structure on to which active material is adhered. The metal grid is desirably one which does not encourage reduction of hydrogen overpotential and thus minimises evolution of hydrogen. Such materials include 99.99% pure lead but this is difficult to handle because it is not self-supporting to any degree and the current conductor structure is thus liable to distortion during assembly. Moreover, such metals are highly susceptible to growth and creep under stress in service. It is thus preferred to use structures which resist deformation under their own weight whilst retaining the desirable characteristic of minimising evolution of hydrogen. Such alloys include those containing up to 0.08% calcium e.g., 0.04 to 0.08%; other alloys which have these desirable properties include those containing tin, aluminium, sodium and magnesium in amounts of up to at least 0.1% e.g., up to 0.2, 0.3, 0.4 or 0.5% by weight either individually or in combination. An alloy containing 0.06 to 0.07% calcium and 0.1% tin is preferred.

The current conducting structures may be cast strips or grids or wrought metal structures such as slit and expanded strips and sheets though these latter materials are liable to loss of shape during handling and pasting and are also susceptible to corrosion problems.

We thus prefer to use wrought structures which are non-distortable in thickness, e.g. perforated or stamped or rolled or slit sheets having apertures therein defining a mesh or grid structure.

We also prefer to provide each current conducting structure with a current collecting strip or bar along at least one edge which will be the top or bottom edge of the structure when assembled in a cell. This has the advantage of reducing corrosion because high current density concentrations, which may occur when individual spaced apart current collecting lugs are used, are avoided.

This current collecting strip may be integral with the structure or formed separately and attached thereto. Its cross-sectional area is desirably at least twice that of the narrowest elements of the structure and desirably at least 3,4,5 or 10 times the cross-sectional area of the thickest element of the structure apart from the said current collecting strip.

The current collecting strip for the plate or plates of one polarity may be connected by a yoke or link to a terminal for that polarity by conventional means but is preferably connected by a novel slotted bar arrangement which fits over the current conducting strip of one polarity and is crimped or welded thereto. The bar preferably has an integral tab which can be led out of the cell to form the terminal or to be connected, e.g., by spot welding, to the tab of an adjacent cell in a battery.

It is preferred to enclose one of the electrodes or electrode polarities in an envelope of separator material which may be open or closed at the ends in the case of a wound assembly or at the sides in a prismatic assembly.

Preferably the positive electrode is enclosed in the envelope with the closed end of the envelope at what will be the bottom end of the positive in use; the positive is thus connected to the terminal yoke at its upper edge.

The current collecting structures may be pasted by conventional means with conventional positive and negative paste compositions.

The active materials are preferably made as porous as possible, preferably the porosity (void volume) of the positive plate should be at least 50%, preferably in the range 50% to 55% or 65%, as measured by mercury intrusion penetrometry. However in a preferred form of the invention the positive active material paste composition contains at least 23, 25 or 28 or 52 to 57 parts by weight of liquids per 100 parts by weight of active material (calculated as $PbO_2$) and at least 0.01, preferably 0.05 and desirably at least 0.1 to 1.0, preferably 0.3 to 0.7, e.g. 0.4 to 0.6, parts by weight of silica calculated as $SiO_2$ per 100 parts by weight of active material (calculated as $PbO_2$). These compositions are thixotropic and this facilitates pasting as well as resulting in a material of high porosity.

The negative active material may contain conventional lignite organic negative active material expanders and conventional inorganic negative active material expanders, e.g., barium sulphate. However, we prefer to use lignin derived negative active materials instead of lignite materials especially with the preferred positive active material described above. The preferred materials are lignosulphonate materials made by digestion of wood pulp with aqueous alkalis and alkaline bisulphites followed by partial oxidation to lower the organically combined sulphur content of the material. Materials of this type are sold under the trade mark VANISPERSE and one suitable material, sold as VANISPERSE CB, is described in detail below.

The separator is selected to have a good moisture retention, a good rate of wicking, i.e it picks up and permits liquids to wick rapidly through it by capillary action and a good gas (especially $O_2$) permeability so as to retain electrolyte within its pores readily and also to permit rapid passage of gas through it even when containing electrolyte.

The separator preferably has a void volume in excess of 40%, e.g., at least 50% or 60% or 70 or 80 or 95%. Non-woven fibrous mats may be used as separators especially glass fibre mats preferably having a thickness in the range 50% to 150% of the thickness of the positive or negative plate, e.g., in the range 0.5 to 3.0 m.m. or more broadly 10% to 200% of the thickness of the positive or negative plate.

The separator may be formed of repeating spaced macro areas having varying moisture absorption and retention characteristics. These areas may be dots, patches or strips, either horizontal or preferably vertical of reduced moisture absorption, which will have increased gas permeability. In one such arrangement, the areas may comprise 1% or 5% to 90% of the area of the separator and preferably 10% to 40% and are desirably distributed evenly over the area of the separator. They may be formed by making the separator of materials of intrinsically varying moisture absorption characteristics, e.g., hydrophobic materials, e.g., silicones or polymer dispersions, e.g., polytetrafluoroethylene emulsions, at the regions where reduced moisture absorption is desired.

In another alternative the material is relatively porous and is compressed in certain regions, preferably as vertical channels, so as to reduce its gas permeability but increase its moisture absorption and wicking rate. Thus in a preferred form of the invention a sealed lead acid cell as defined herein is characterised in that it has electrodes comprising metallic supports which minimize the evolution of hydrogen and resist deformation under their own weight, and at least one of which is enclosed in an envelope of separator material, the support of the positive electrodes or electrode having positive active material deposited thereon and the support of the negative electrode or electrodes having negative active material deposited thereon, and in which the capacity of the negative electrodes is at least 1% greater than the capacity of the positive electrodes at the 20 hour rate of discharge, the thickness of the electrodes is less than 3mm, the thickness of the separator is in the range of 10% to 200% of the thickness of the electrode, and the volume of electrolyte, E, in the cell in relation to the sum of the pore volume, X, of the separators and the pore volume, Y, of the positive and negative active materials is not greater than $2X + Y$, and in which the separator is formed with repeating spaced macroareas having varying moisture absorption and retention characteristics.

In cells of this type, the so called sealed cells, gases generated during operation, e.g., hydrogen and oxygen, can either be recombined with each other, e.g., at catalytic locations, or more preferably, the cell is arranged so that only oxygen is liable to be generated, e.g., on overcharge, and the cell is arranged so that this oxygen under all but exceptional circumstances can react with negative active material thus preventing excessive pressure build-up.

Gases generated at the positive permeate through the separator to the negative to recombine therewith directly.

In order to ensure that the system will be such that the positive is under all conditions charged before the negative is charged and thus that only oxygen is liable to be evolved on overcharge the negative capacity is arranged to be at least as great as that of the positive and desirably significantly greater, preferably at least 1%, 5, 10 or 20% greater in ampere hours at the 5,10 or 20 hour rates of discharge.

Equally, the mass of negative active material may be arranged to be at least equal to and desirably at least 1%, 5,10 or 20% greater than the mass of positive active material.

The electrode thicknesses are preferably less than 3 mm., particularly 0.5 to 2.0 or 1.5 or 1.0 mm.

The ratio of electrolyte volume to the sum of the pore volume of the separators and the pore volume of the positive and negative active materials is preferably at least 1:1 in the cell, preferably 1:1 up to 1.25:1.

Wound electrode assemblies have the advantage of a high energy per unit volume as individual cells. However, when these cells are combined into batteries, a wast of space occurs with cylindrical cells. We thus prefer to wind our assemblies around square or rectangular formers which may be hollow, solid or porous, hollow or porous formers being preferred; the porous formers may be mesh or grid shaped or made of sintered crumbs, preferably 1 to 3 to 5 mm. across which produce a coarsely porous material having a low water absorption. The former may have an arcuate slot formed in it to receive and clamp the inner end of the electrode/separator/electrode assembly which is preferably wound with the negative on the outside.

The cells may be enclosed in a plastic container, preferably of polypropylene or polyethylene, which is acid resistant but not necessarily burstproof. Pressure containment may be provided by packing the cells into a rigid battery box either of metal or reinforced plastics preferably reinforced by external ribs. Rectangular or square cells have the advantage of needing little or no extra support and alignment of the cells in the battery is simple.

Cylindrical cells have the disadvantage of being able to pack in any orientation and thus alignment of the terminals when both terminals are located at one end of the battery can cause problems.

We prefer to overcome this by locating each cylindrical cell in an assymmetrical shroud so shaped as to fit side by side with another shrouded cell in only one configuration in which, provided the cells are correctly located in the shrouds, the terminals will be automatically aligned, preferably with terminals of one sign in a row down the middle of the top of the battery and terminals of the other sign in two rows down either side of the top of the battery.

If the terminals of the cell come out at either end of the cell, they may be arranged so as to extend in a row along the top of the battery for one polarity and along the bottom of the battery for the other polarity.

Intercell connectors may be provided in a number of ways. The shrouds may be made of heat resisting polymer whereby ducts can be preformed therein and molten lead poured in. In another alternative the shrouds do not have to have this degree of heat resistance and the ducts are merely used to locate an intercell connector bar or strap which is spot welded to the cell terminals or the upstanding lugs on the preferred crimped comb intercell connector described aove which as a further alternative can be bent over into the duct and spot welded to the lug on the adjacent cell. The ducts can then be filled with insulating resin which is preferably self flame quenching or contains a flame quenching additive.

In an alternative arrangement, a preformed lid (and base if bottom terminals are present) is used with both the shrouded cylindrical cells and the rectilinear cells. This contains prelocated intercell connectors, e.g., moulded into a plastic lid which can again be spot welded to the cell terminals. The lid (or base) preferably also contains a preformed venting manifold arranged to co-operate with the separate individual cell vents. The manifold may contain baffles or absorbent chemicals such as magnesium oxide to absorb and traces of acid which may be vented. The cells may be provided with individual venting valves, preferably of the so-called Bunsen burner type, or preferably are merely provided with an upstanding reinforced collar in the lid sealed with a thin perforatable thickness of polymer. (The cell lids may be an integral moulding).

This enables the cells to be stored fully sealed after manufacture until assembly into a battery, e.g., for automotive use.

This thin seal can then be perforated immediately before assembly of the cells into a battery. The upstanding collar on the lid then acts as a valve seating for a resilient, preferably, elastomeric, valve strip, which may be continuous, located in the manifold and arranged to normally seal the outlet from each cell.

The cells are desirably filled with electrolyte by being flooded therewith, electrolytically charged, evacuated to draw off gasses from the pores of the separator and the active material and replace them with electrolyte and then excess electrolyte is allowed to drain off under gravity. The volume of electrolyte is thus at least equal to the pore volume of the separator and active material combined. In the preferred arrangment in which an electrolyte reservoir is provided the volume of electrolyte present in the cell is about 5 to 30% e.g., 10 to 20% greater than the pore volume of the active material and the separator.

The modular possibilities of these cells would permit one to make up batteries of varying performance by series/parallel assemblies of a standard cell, e.g., a 2 volt 5 amp hour cell could be used to make a 12 volt 5 amp hour battery by connecting six cells in series, a 2 volt 10 amp hour battery by connecting two cells in parallel and a 12 volt 60 amp hour battery by connecting in series 6 pairs of cells connected in parallel.

When a bottom current collecting link is being used there may be a dead space at the bottom of the cell into which the electrolyte may settle. This can be avoided by nesting the current collecting link in a preformed dish which fills the dead space.

When the cell is increased in size to provide extra capacity problems may arise if the dimensions of the cell are not kept within certain limits. If the cell is made too tall the separators may no longer be able to retain the electrolyte at an adequate concentration at the top of the cell. We thus prefer to use an assembly in which the height of the separator is not greater than 150%, e.g., less than 100% or 70% or 50% of the free wicking height of the separator. The free wicking height is the height to which 1.28 sp. gr. sulphuric acid rises up a strip of the material when the material is suspended vertically above a bath of the acid with 1 cm. of the end of the strip below the surface of the acid and the strip and bath are enclosed in a sealed environment at 20° C for 1 hour, so as to reach equilibrium.

Desirably the ratio of the positive and negative active masses combined in grams to the separator height is at least 13:1 and desirably at least 15:1 or 20:1 or 30:1 or greater.

The cells are desirably positioned in the battery so that these requirements of separator height in relationship to free wicking height are fulfilled, e.g. with prismatic cells a cell which would otherwise be too tall and thus liable to electrolyte displacement may be positioned on its side.

In order to provide for increased cycle life and tolerance to misuse and to permit increased rates of charge we prefer to provide an extra supply of electrolyte beyond that merely sufficient to be absorbed by the separator. We thus may provide a porous electrolyte retaining reservoir capable of holding at least 10% and preferably 30 to 100% e.g. 40 to 60% of the amount of electrolyte absorbed by the separators. The porous reservoir absorbs and retains electrolyte and is arranged in wicking relationship to the separators, whereby liquid can pass from the reservoir to the separators.

The reservoir may be comprised of a pad or coil of separator material. Alternatively it may be made of a material of lower moisture absorption than the separators themselves.

As mentioned above, adequate gas permaeability of the separators can be ensured by reducing the moisture permeability of selected spaced apart regions of the separator so that in effect it acts partly as an ion transfer medium, partly as a gas transfer medium through the regions of reduced electrolyte content and partly as a physical spacer.

The porous reservoir may be a sintered block of polyethylene crumbs, e.g, a material sold as VYON G or VYON (RTM) or a mat of glass fibre more open than the preferred felted glass fibre separators.

In an alternative electrode separator assembly the negative plate or plates are provided with a current collecting strip along one edge of the assembly and extending out therefrom and the positive plate or plates are provided with a current collecting strip at another or opposite face of the assembly and extending out therefrom. With a wound assembly, the extending current collecting strips will extend from opposite ends of the assembly; whilst this is preferred also for prismatic assemblies, in such an assembly the current collecting strips can extend from adjacent sides of the assembly if desired. These strips assist in imparting structural integrity and resistance to accidental deformation to the current collecting structures.

This arrangement reduces the risk of corrosion of the grid since high current densities in the current collecting structure are minimised. It also increases the flexibility of the assembly of individual cells into batteries and simplifies the provision of automatic intercell connection since the positive terminals can all be at one end or side of the cell and the negative terminals all at another end or side of the cell.

In a further alternative microporous polymer sheets having plain flat faces such as microporous polyvinyl chloride are used as the separator. A suitable such material is sold as PORVIC 1. This made by extracting swollen starch from a polyvinyl choride dough in accordance with British Pat. No. 526022 and has a low pore size of 1 - 3 microns and a porosity of 80% to 90%.

As mentioned above gases generated at the positive can permeate through the separator to the negative to recombine therewith directly but this is relatively slow. Thus in another alternative form of the invention we prefer to provide at least one region of free negative active material area where a face of a negative electrode is not juxtaposed to a positive electrode but instead is exposed to a free gas space. We prefer to utilise the face of at least one negative plate of a prismatic assembly, e.g., 1 negative free for each 5 or 6 positive plates, and the outside surface area of a wound assembly though here as little as one-tenth, one-quarter or one-half of the outside face only could be used.

The term free negative active material area means any area which is either directly free to a gas space defined by a body spaced at least 1 mm. and preferably at least 2, 3, 4 or 5 mm. from the said free area, or is only separated from such an area by a single separator layer or a single separator layer having a moisture absorption which is less than, and preferably not more than, 80%, 60% or 40% of that of the separators separating the positive from the negative electrodes.

The term free gas space means any region not occupied by an electrode or a separator within the cell container.

Preferably the free gas space between the face of the negative plate and the inner wall of the container is occupied by a reticulated spacer having no moisture absorption capability, e.g., formed of a solid polymer mesh or grid of such mesh size as to have substantially no wicking action and overlying not more than 10 or 20% of the free negative active material area. This mesh or grid permits free flow of gas through the free gas space.

The outer surface of the free negative active material area as mentioned above may be covered by a separator type material to assist in retaining the active material in place. However, this retainer desirably has a lower moisture absorption than the separators so as to facilitate gas access to the free negative active material area, e.g., it may be treated with a hydrophobic material such as silicones or polymer, e.g., PTFE dispersions, so as to render it of lower moisture absorption characteristics or may be made of a hydrophobic polymer, e.g., a coarse grained rigid porous polymer, e.g., sintered polyethylene such as VYON G or VYON F.

In a further form of the invention the ratio of negative and positive active material mass in grams to electrolyte volume in cc (as 1.28 sp. gr. sulphuric acid) is preferably not more than 5:1 in particular in the range 2.0:1 to 4:1 or more preferably 2.0:1 to 2.5:1 or 3:1.

The ratio of total free negative active material area in sq. cm. to separator pore volume in c.c. is preferably at least 0.3:1 and preferably is greater than 0.7:1, e.g., greater than 1:1, e.g. 1:1 to 2:1, 3:1, 5:1 or 10:1 or 15:1. For the wound type of cell utilising four turns of the positive/separator/negative sheath the plates and separator being about 1 mm. thick and 28 cm. long and 6 cm. wide, the separator volume is about 17 cc; with a separator of porosity of 50%, the separator void volume is about 8.5 cc; with a separator of porosity of 95% the separator void volume is about 16 cc.

Thus when the external surface, of the outside turn having a radius of 3 cm. of the negative plate of the electrode assembly, is left as free negative active material area it has an area of about 115 sq. cm., i.e., the ratio is about 6.7:1.

The ratio of the free negative active material area in sq. cm. to the mass of positive active material in g. is preferably at least 0.15:1 and is desirably at least 0.3:1, e.g., 0.5:1, but more preferably at least 1:1, e.g., 2:1 or 3:1 or 5:1 or 10:1 e.g., in the range 2:1 to 10:1.

Certain prior proposals for sealed lead acid cells have suggested that the free gas space should be kept to a minimum. We prefer, however, to provide a significant free gas space so as to avoid premature venting of gas and thus loss of electrolyte from the system. We thus prefer to have a ratio of free gas space in cc. to positive active material in g. of at least 0.5:1 and particularly at least 0.8:1, e.g., 0.9:1 or 1:1, and desirably in the range 2.8:1 to 5:1.

Figure 2:
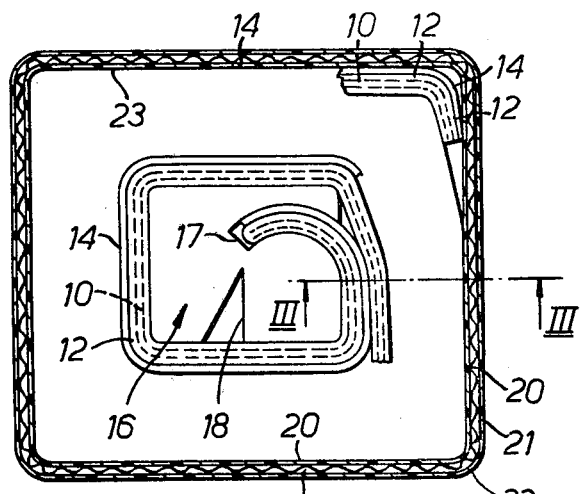
Figure 3:
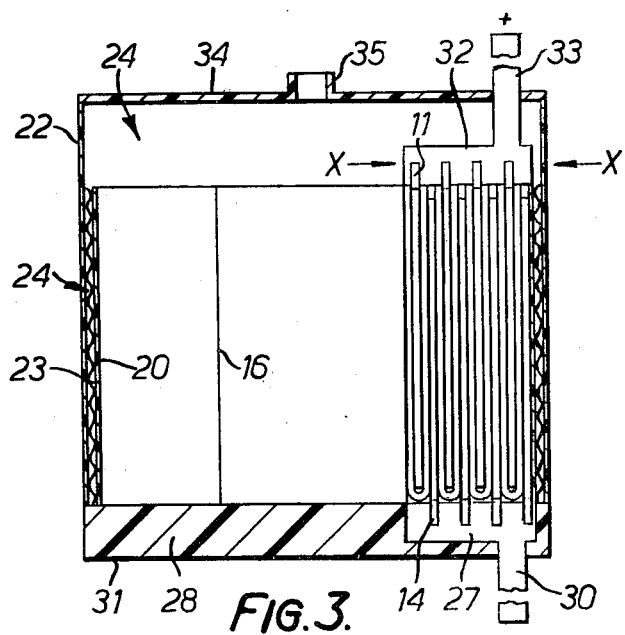
Figure 4:
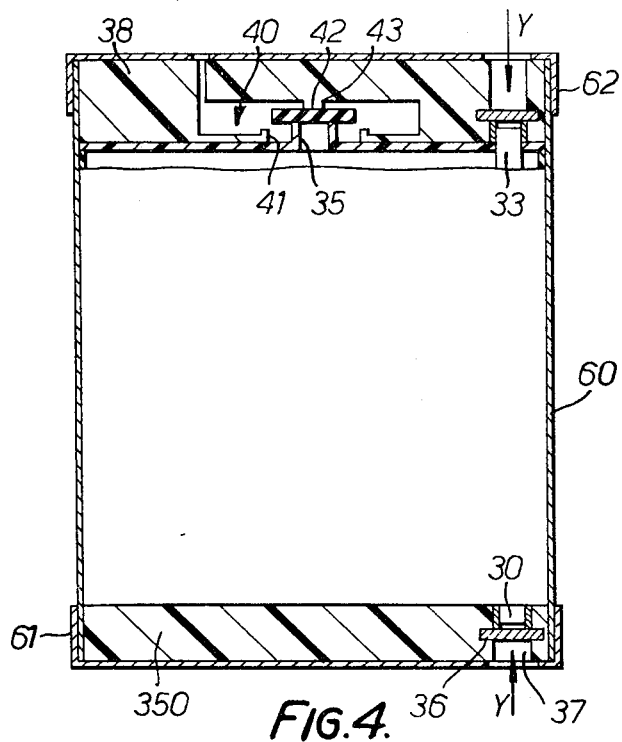
Figure 5:
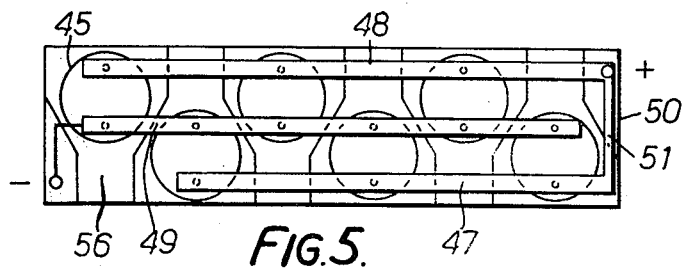
Figure 8:
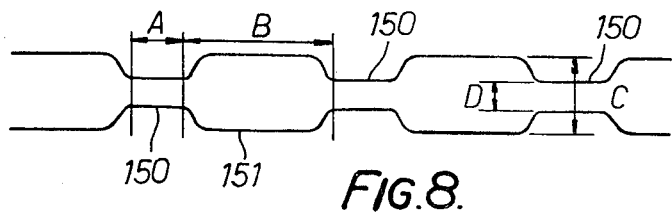

The invention may be put into practice in various ways and various specific embodiment of a cell in accordance with the invention and some modifications thereof will be described with reference to the accompanying diagrammatic drawings in which FIG. 1 is a perspective view of an electrode/separator/electrode assembly for use in a wound cell in accordance with a first embodiment of the invention, FIG. 2 is an underneath plan view of a cell in accordance with the present invention, utilising an assembly as shown in FIG. 1, FIG. 3 is a partial cross-section on the line III—III of FIG. 2, FIG. 4 is a view similar to FIG. 3 showing a cell assembled in a battery box, FIG. 5 is a diagrammatic plan view of an alternative form of battery assembly, FIG. 6 is a diagrammatic part longitudinal cross section through the longitudinal axis of a single rechargeable cell in accordance with a second embodiment of the invention, FIG. 7 is a side perspective exploded view of the electrode and separator structure shown in FIG. 6 prior to winding into a spiral, FIG. 8 is a cross section on an enlarged scale of the separator material shown in FIGS. 6 and 7, FIGS. 9 to 12 are photomicrographs of the preferred separator material.

FIG. 1 shows an enveloped positive strip electrode 10 enclosed at its bottom edge by a separator envelope 12 which extends up to the region of a current collector strip 11 integrally formed with the grid. It also shows a negative strip 13 with an integral current collector strip 14 extending out beyond the bottom edge of the envelope 12. As can be seen in FIG. 2, the inner end of the envelope 12 is preferably sealed whilst the outer end extends out beyond the outer end of the positive.

Both the strips are self-supporting lead alloy structures made by slitting. They are pasted with conventional active materials.

FIG. 2 shows a central core 16 having a slot 17 to receive and grip the inner end of the electrode assembly; the notch 18 imparts a spring action to the core enabling the slot 17 to be flexed open.

The whole of the wound assembly is not shown, only the inner and outer free negative plate affording a free negative active material area 23 on its outer face. The active material is retained by means of a hydrophobic sintered semi-rigid porous polyethylene tube or wrapping 20 which is a tight fit around the wound electrode assembly, a free gas space 24 is provided by means of a spacer 21 of melt woven polyethylene (NETLON) having strands about 1.5 mm. thick spaced about 2 to 5 mm. apart but affording essentially only line contact with the retainer 20. The whole assembly is contained within a moulded polypropylene cell container 22.

FIG. 3 shows a partial cross section of the cell shown in FIG. 2. As can be seen the current collecting strip 14 of the negative electrode engages a toothed current collecting comb 27 which is nested in a plastic block 28 which fills the dead space at the bottom of the cell. The comb 27 has an integral lug 30 which passes out through the bottom wall 31 of the cell. The comb 27 is attached to the strip 14 by application of crimping pressure as shown for the positive comb 32 by the arrows X — X.

The comb 32 also has a lug 33 which passes out through the top wall 34 of the cell.

A vent collar 35 is located at the centre of the top wall. This is sealed until the cell is put into use or assembled into a battery.

FIG. 4 shows a cell assembled in a battery box or in an outer cell container.

The cell is provided with a base 35 of moulded polymer material having an intercell connector or terminal base 36 e.g. of copper strip integrally moulded therein ready for spot welding Y to the lug 30 of the negative plate. An external lug can subsequently be provided in the recess 37.

The cell is also provided with a lid 38 incorporating a similar terminal arrangement for the positive electrode.

The lid also incorporates a venting manifold 40 extending the length of the battery. The bottom of the manifold has a slot 41 formed in it wide enough for a rubber valve member 42 to be inserted into the manifold and secured to a boss 43 on the roof of the manifold. The dimensions of the lid 38, the manifold 40, the valve member 42 and the collar 35 are such that the top edge of the collar seals against the valve member 42 except at high pressures when the edges of the valve member 42 are lifted off the seating 35 when venting occurs.

FIG. 5 shows an alternative arrangement in which cylindrical cells 45 in accordance with the invention are housed in assymmetrical essentially Y shaped solid shrouds 56, e.g., of hard rubber or other cheap essentially non-compressible material. Each cylindrical cell 45 is housed in its shroud 56 (in which it is desirably a push fit with its polarities in the same orientation, e.g., with its negative terminal by the waist of the Y).

In this arrangement, the terminals are on opposite sides of the cell, the negative lug 30 being led round the outside of the cell, between it and the shroud.

The battery is also provided with a lid similar to that shown in FIG. 4 except that two vent manifolds are provided and three integrally moulded intercell connector strips as shown at 49, 47 and 48. The positive strips 47 and 48 are connected by cutting a slot 50 across above the strip 49 and inserting a cross link 51 and welding it to the exposed strips 47 and 48.

Clearly, if desired, the lids could be provided merely with apertures for the cell terminals at the correct spacings and longitudinal slots and the lugs could be used as the connectors and welded to each other or to separate connectors located in the slots.

The slots could then be filled with insulating resin.

The assembly has a battery casing similar to that shown in FIG. 4 in which an open top and bottom metal (steel) box 60 is provided with a base 61 and lid 62 provided with appropriate apertures for terminals and vents and the lid and base are welded to the box or otherwise connected.

VYON F is a sintered polyethylene sheet material of 50% volume porosity and an air permeability of 70 to 100 cu. ft. air/min at 1 inch static water gauge. It is hydrophobic and not readily wetted by water. It is inert to 1.28 sp.gr. sulphuric acid. We prefer to use it at thicknesses of 0.03 inch to 0.04. It does not readily wick up sulphuric acid.

VYON G is made by granulating 3/16 inch thick VYON F into chips less that 5/15 inch by 3/16 inch and then sintering these chips into sheets ¼ inch to ½ inch thick. The material has an air permeability of 200 - 300 cu.ft./min at 2 to 3 inch static water gauge and a void volume of 70% to 80%.

The cell shown in FIG. 6 consists of a spiral assembly wound from a single negative electrode 110 interleaved with a single positive electrode 111 sheathed in a separator 112. This electrode assembly is enclosed within a cylindrical metal container 115 which is electrically connected to the negative electrode of the cell and thus affords the negative terminal of the cell. The container 115 is closed by a metal cover 116 which is insulated from the container 115 by a resilient insulating seal 117 and is electrically connected to the positive electrode 111 and thus affords the positive terminal for the cell.

The electrode assembly is wrapped in an outer band 120 of separator material and rests on a spiral disk of separator material which affords a reservoir 122 for electrolyte so as to reduce the risk of the cell being acid limited in use.

The electrode assembly has a central longitudinal channel 124 in which is located the bottom end of a vent assembly 126. The vent assembly has a central tube 125 open at the bottom end and closed at the top end by a resilient cap 127, the skirt 128 of which normally closes a hole 129 which passes through the wall of the top end of the central tube. A radial dish 130 extends out from the central tube 125 below the hole 129 and has an upstanding outer wall 132 which is a sliding fit inside the container 115.

An annulus 133 of separator material is located in the dish 132 and has the function of absorbing any acid spray which may be vented by the vent assembly 126 through the hole 129 during which pressure conditions in the cell, whilst permitting gas escape through a hole 135 in the cover 116.

To this end the annulus 133 may be treated, e.g., impregnated with an alkaline material e.g. Magnesium oxide or calcium carbonate.

FIG. 7 shows the positive electrode 11 sheathed in a separator sheath 112 which is formed from a strip of material a little more than twice the width of the electrode strip. This sheath is sealed at the inner end 137 and along its top edge 138 between the current collecting terminals 140.

These terminals 140 are integral with a solid selvedge 141 along the top edge of the positive grid and are disposed logarithmically so that when the assembly is wound the terminals 140 are disposed radially in a straight line. They are connected together by a bar 143 and a lug 144 extends up through the dish 130 through the annulus 133 and up to the cover 116 of the container 115 to which it is connected e.g. by spot welding.

The negative electrode 110 is similarly provided with a selvedge 145 and logarithmically disposed lugs 146 offset from the lugs 140 so as to be disposed on a different radius when the assembly is wound. The lugs 146 are similarly connected via a bar 147 and lug 148 but to the container 115 rather than the cover 116.

The separator material used for the sheath 112, the reservoir 122, the band 120 and preferably also the annulus 133 is shown in much enlarged cross section in FIG. 8. It is made from polyester fibre by laying down as a non-woven bed of fibres e.g. as a air or water leaf followed by heating and possibly also pressure to temperatures such that the fibres fuse at their points of contact. The fibres are typically 25 to 150 mms, e.g. 80 to 100 or about 90 mms long and have a fused point of contact with other fibres every 1 to 10 e.g. 3 to 8 or about every 5 mm length of fibre. The diameters of the fibres are typically in the range 5 to 50 e.g. 10 to 30 or about 17 microns.

The material has a porosity of 70 to 75% (as measured by comparison of the density determined by Helium absorption and apparent density determined by mercury absorption) and an air permeablity when dry of $1.67 \times 10^{-2}$ liters per sec. per cm head of water per square cm.

It has an electrical resistance measured in 1.280 sp. gr. aqueous sulphuric acid of 3.0 milliohms per 4 square inches. It has a tensile strength in the range 0.25 to 0.62 kg.mm$^{-2}$ as measured on a dry sample using a Houndsfield tensile testing machine, using a 5 cms long sample at a rate of extension of 3.18 mm per minute. It has an oxidation loss of 0.14% when a sample is exposed to oxidative conditions consisting of immersion in a 2.0% by weight potassium dichromate solution in sulphuric acid (1.050 S.G.) at 60° C for 24 hours.

It has a burst strength when dry on the burst test using Messmer burst testing equipment in excess of 850 KPa (Kilopascal - 1 pascal is 1 Newton per sq meter). It has the following pore size distribution as measured by mercury porosimetry 5% of the total porosity is provided by voids and the pores connecting such voids which are less than 25 microns in diameter. 12% is provided by voids and the pores connecting such voids which are between 25 and 50 microns in diameter. 40% is provided by voids and the pores connecting such voids which are between 50 and 100 microns in diameter. 12% is provided by voids and the pores connecting such voids which are between 100 and 200 microns in diameter and 4% is provided by voids and the pores connecting such voids which are above 200 microns.

The material as can be seen in FIG. 8 is provided with channels 150 which are provided by regions which have been subjected to increased heat and pressure and which whilst still porous are more dense than the remaining regions 151.

The compressed region 150 provide for a much enhanced rate of liquid transport whilst the uncompressed regions 151 facilitate gas transport through the material. Referring to FIG. 8 A is the width of the region 150, B the width of the region 151, C is the thickness of the region 151 and D is the thickness of the region 150. The ratio of B to A is preferably at least 1:1, 2:1 or 3:1 and preferably in the range 4:1 to 10:1 e.g. 5:1 to 7:1. A is preferably 0.5 to 2 cms. the thickness of the region 150, namely D, is preferably 0.05 to 0.5 mms whilst the thickness of the region 151, namely C, is preferably 0.3 to 2 mms, e.g. 0.5 to 1.0 mms. In our preferred separator C is 0.6 mms and D is about 0.1 mms and B/A is 4.

The separator material has a high rate of wicking up the compressed channels 150 which are preferably disposed vertically in the cell i.e. parallel to the longitudinal axis. Thus when the bottom edge of the material is immersed in 1.280 sp. gravity sulphuric acid at 20° C in an ambient atmosphere, the electrolyte risen 4 cms up the channels 150 in 15 seconds and 10 cms in 2 minutes. The acid permeates out sideways from the channels 150 into the regions 151 more slowly.

EXAMPLE 1

In a preferred cell the separator 112 has a size of 46 cms long, 5.5 cms high and 0.06 cms thick and the volume is twice this for the envelope 112. This has a volume porosity of 75% and thus the pore volume of the separator, let us call it X, is 22.8 cc.

The positive and negative electrodes 110 and 111 each are 44 cms long, 5.0 cms high and 0.10 cms thick. They have a porosity of 50% and thus the pore volume of the electrodes, let us call it Y, is 22 cc.

The reservoir 122 is 1.0 cms high, 200 cms long and 0.06 cms thick. It has a porosity of 75% and thus the pore volume of the reservoir, let us call it Z, is 9.0 cc.

The band 120 has a height of 6.0 cms, a length of 13 cms and a thickness of 0.06 cms. It has a porosity of 75% and the pore volume of the band 120, let us call it W, is 4.0 cc. Thus X + X + Z + W is 57.8 cc.

As explained in more detail below the volumes of electrolyte in the cell is arranged to be at least X + Y + Z + W cc and preferably up to a small excess e.g. 10% excess over that value.

This ensures that the cell avoids being acid limited or electrolyte starved during use but the differential permeability of the separator enables gas recombination to occur in the cell.

EXAMPLE 2

In an alternative arrangement the electrodes are made slightly thinner 0.09 cms. and longer 48 cms and the separator is made slightly longer 50 cms. Here X + Y + Z + W = 59.1 cc.

EXAMPLE 3

In a further alternative the electrodes are made thinner still 0.08 cms. and longer 54 cms. and the separator again longer, namely 56 cms. Here X + Y + Z + W = 62.3 cc.

The electrodes are made of a lead alloy containing 0.06% calcium and 0.10% tin and are made from sheet material 0.007 cms to 0.07 cms thick by slitting and pulling the material so as to expand the slits into diamond shaped holes. As mentioned above the electrodes have a continuous solid selvedge along one edge provided with integral lugs.

The length of the diamond is 0.7 cms. and its width 0.25 to 0.32 cms.

The electrode has 65 openings per sq. inch. The width of the strands between diamonds is 0.018 cms. to 1.4 cms.

We prefer to use this alloy rather than pure lead because it avoids the problems of creep and change in dimensions due to active material volume changes during charge/discharge cycles. Such stressed areas are very liable to corrosion with pure lead.

The negative electrode is pasted with a negative active material containing lignin derived lignosulphonate material e.g. 0.1% to 0.8% e.g. 0.1% to 0.5% by weight based on the lead content of the active material, the lignin derived lignosulphonates being substantially free from interfering metal ions e.g. containing less than 0.2% of interfering triple valency metal ions and being derived from lignin by oxidation for example sodium or potassium lignosulphonate. The negative active material desirably also contains inorganic negative active material expander, e.g. barium sulphate, e.g. 0.1% to 0.5% by weight based on the lead content of the negative active material.

One particular material described as a purified lignosulphonate which has been found effective in the present invention is characterized by the following properties: (materials of this type are sold under the Trade Mark VANISPERSE). These lignosulphonates are derived from lignin by oxidation. Lignin is a by-product of the treatment of wood pulp and is obtained by the digestion of aqueous alkalis and alkaline bisulphites and is a by-product of paper production. The alkali soluble lignins appear likely to be chemically modified forms of the native lignin present in wood. e.g. oxylignins.

The lignosulphonate derivatives are made from the lignin by oxidation to lower the organically combined sulphur content. Molecular condensation and rearrangement is also thought to occur during this oxidation process.

| Typical Analysis (moisture free basis) VANISPERSE C.B. | |
|---|---|
| pH 3% solution in water | 8.8 |
| Total sulphur as S % | 2.4 |
| Sulphate Sulphur as S % | <0.03 |
| Sulphite Sulphur as S % | <0.03 |
| CaO% | 0.004 |
| MgO% | 0.002 |
| $Na_2O$% | 9.9 |
| Reducing Sugars | None |
| $OCH_3$% | 12.7 |

| Physical Characteristics | |
|---|---|
| Usual Form | Powder |
| Moisture Content(Max.% $H_2O$) | 7.0 |
| Colour | Brown |
| Bulk Density (lbs/cu.ft) | 35–40 |
| Solubility in water (%) | 100 |
| Solubility in oils and most organic solvents (%) | 0 |
| Surface Tension 1% sol'n in Dynes/cm | 51.4 |
| Total Triple valency cations | 0.03% |

It will be observed that the material is substantially sodium lignosulphonate with a significant chemically analysable methoxy group content and substantial absence of sulphite groups. In addition the triple valency cation content is only 0.03%.

Triple valency cations such as $Fe^{3+}$ are known to interfere with and reduce the performance of lead acid electric storage batteries.

As mentioned above lignosulphonic acids and lignosulphonates derived from lignin, a wood constituent, are used in the present invention. Lignin is thought to bind the cellulose fibres together in wood and woody plants. It is a polymer which will vary somewhat in chemical make-up depending upon the plant source.

It is thought that the polymer comprises substituted phenyl propane monomers but the exact manner in which they combine to form the polymer lignin is not known. Thus it must be appreciated that a lignosulphonic acid or a lignosulphonate probably constitutes a group of closely related compounds rather than being a distinct chemical entity.

The term "lignosulphonic acid" refers to a material general available from the liquors produced by the sulphite, sulphate, soda ammonia base and other conventional processes for pulping wood. The term "lignosulphonate" refers to a salt of lignosulphonic acid. Lignosulphonic acids are available in a variety of commercial forms and products, generally in the form of salt e.g. a sodium or potassium salt or mixtures of salts thereof. Both the free lignosulphonic acids and the salts thereof are within the scope of this invention. However, the higher water solubility of the lignosulphonates renders them more convenient and easy to handle; otherwise the free acid and salts are essentially the same for purposes of this invention.

Desirably additional liquor and amorphous silica are added to this negative active material, namely for each 1000 Kg of active material 265 mls of additional liquor per Kg of active material and 4.5 Kgs of amorphous silica, namely GASIL 23; this produces active material composition having a density of 3.8 gr/cc and the pasted electrode has a void volume of 58% and absorbs 22% of 1.280 sp.gr. sulphuric acid.

One specific negative active material composition N1 (without added liquor and silica) has the following composition.

| | |
|---|---|
| Leady Oxide | 1.091 Kg. |
| Vanisperse CB lignosulphonate | 3.2 Kgs. |
| Barium Sulphate | 5.5 Kgs. |
| Fibre | 0.23 Kg. |
| Antioxidant (stearic acid) | 0.56 Kg. |
| Carbon Black | 1.8 Kgs. |
| Water | 122 liters |
| Sulphuric Acid (1.4 S.G.) | 70 liters. |

The oxide was placed in an August-Simpson paste mixer followed by the remaining dry ingredients: Vanisperse lignosulphate, barium sulphate, fibre, antioxidant and carbon black in any order. The mixer was run for a few minutes until the dry powders were thoroughly blended.

The specified volume of water was slowly added with the mixer running and then the acid was added over a period of 15 minutes still with the mixer running. Mixing was continued for a further 5 minutes and was then complete.

Vanisperse CB content based on active material is 0.3%. Vanisperse CB is commercially pure sodium lignosulphonate and the lignosulphonate content is about 80%. Thus the lignosulphonate content of the negative active material is about 0.24%.

An alternative and preferred negative active material contains additional liquor and amorphous silica as mentioned above. Thus one preferred alternative paste, N2, has the same composition as N1 but has 4.9 Kgs. of GASIL 23 amorphous silica, which is added to the dry ingredients and 183 liters of additional water, and 106 liters of additional sulphuric acid (1.4 sp.gr.). This paste has a density of 3.8.

In another alternative paste N3, which is similar to N2 the silica content is 5.7 Kgs. and the additional water is 208 liters and the additional acid is 119.3 liters. This paste has a density of 3.5 gr. cc and a void volume of 62% and acid absorption of 25%.

The weight of negative active material N2 is 43 grams in Example 1, 48 grams in Example 2 and 40 grams in Example 3.

The positive active material P1 is provided with the same amount of additional liquor and amorphous silica and is pasted on to the positive electrode in the same weight.

Specific examples of positive active materials are as follows:

| P1 | |
|---|---|
| Active material | 1000 Kgs. |
| 40% lead | |
| 60% lead monoxide | |
| Water | 297.9 liters |
| Sulphuric acid (1.4 sp. gr) | 156.1 liters |
| Amorphous silica (gasil 23) | 4.5 Kgs. |
| P2 | |
| As P1 except silica content is | 5.2 Kgs |
| Water content is | 320 liters |
| Acid content is | 177.6 liters. |

We find that using these pastes having densities of 3.8 and below especially 3.2 to 3.6 greatly enhances the rate of oxygen recombination at the negative electrode.

The presence of the amorphous silica with its large pore volume is also believed to assist in acid absorption by the plate since the increase is acid absorption appears to be greater than the increase in void volume.

The porosity values specified herein are determined by the well known mercury porosimetry or mercury intrusion method according to the general procedure described in "Pore size Distribution by Mercury Penetration" by Winslow and Shapiro in the ASTM Bulletin, February, 1959.

The method is as follows: The pressure required to force mercury into a pore is inversely proportional to the pore diameter. The volume of mercury forced into the pore is equal to the pore volume. The porosity of a sample is plotted against the pore size by observation of the volume of mercury forced into the sample at set pressures.

First the apparent volume of the sample is determined by geometry.

The machine used was a AMINCO machine.

The porosity as defined herein is the volume of mercury (expressed as a % of the total volume of the sample) which can be forced into the sample up to a pressure of 5,000 p.s.i.

Preferably the silica is added as amorphous silica of a micron or submicron particle size and a surface area in the range 50 to 700 especially 100 to 400 or around 200 to 300 sq. meters per gram.

Desirably the amorphous silica (amorphous to X-rays) has a submicron ultimate particle size as measured by a Coulter counter, for example in the range 10 to 50 millimicrons though it may be agglomerated to larger average particle sizes for example of micron size such as 1–15 e.g. 5–10 microns or be of such larger ultimate particle size.

The amorphous silica can be added as such, for example, as the proprietory material GASIL (Trade Mark) e.g. GASIL 23 sold by Joseph Crosfield & Sons Ltd. and described in their Technical Publication No. 25 printed April 1969 (reference M598) or as the proprietory material AEROSIL (Trade Mark) e.g. AEROSIL R972 described in "Chemiker-Zeitung/Chemische Apparatur" 89/1965 pages 437–440.

GASIL is made by precipitation of a gel from sodium silicate solution with acid followed by drying, washing and hydrothermal or steam treatment to produce a material having a pore size of the order of 120 to 140 Angstroms with a surface area of 100 to 300 e.g. about 200 square meters per gram and a small particle size as described above e.g. 5 microns or less e.g. 3 to 5 microns. GASIL 23 has a maximum percentage weight loss of 12% at 1000° C, a pH of 6 to 8 as a 10% aqueous suspension, an oil absorption of 295 to 345 grams per 100 grams and the solids after ignition have a minimum silica content of 99.0%.

AEROSIL R.972 is believed to be a pyrogenic silica made as described in British patent specification No. 1031764 which corresponds to French Pat. No. 1368765 mentioned in "Chemische Zeitung" above.

AEROSIL R.972 has an average particle size of about 20 millimicrons and a surface area of $120 \pm 30$ square meters per gram.

The disclosure of these three documents are incorporated herein by reference.

When silicas having a submicron particle size such as Cabosi M5 (R.T.M) (trade name for a fumed or thermal silica sold in the United States of America and believed similar if not identical to Aerosil R972) are used at the 0.5 parts level a tendency has been observed for the pastes to harden too quickly and not remain workable overnight as is desirable. One should thus test the effect of the particular silica used in conjunction with the amount of extra liquids and the amount of silica used to achieve the desired balance of thixotropy and workability.

It is believed that with submicron particle size silicas this balance may be achieved by reducing the amount of silica used or increasing the amount of liquids or both.

Amorphous silica is characterised by the presence of silanol and hydroxyl groups i.e. free hydroxyl groups extending out from the surface of the silica polymer molecule which groups are capable of entering into a variety of relationships and bonds with appropriate groups or atoms of other molecules. In particular the OH groups can form hydrogen bonds with other OH groups in other molecules and especially with water.

Thus whilst the present invention is not dependant on any particular theory it is thought that these silanol groups may be interacting with OH groups or water molecules present in the hydrated leady oxide and that this may account for the increase in strength. This possibly may also be influence by the particular temperatures and times at which the plates are dried after pasting.

The preferred amorphous silicas for use in the present invention are characterised by the presence of micropores in their structure; these are preferably in the range 50 to 200 Angstroms particularly 100 to 150 especially 120 to 140 Angstroms. The preferred silicas have a pore void volume of 0.1 to 5 ccs. per gram.

The electrolyte preferably has a specific gravity in the range 1.33 to 1.41 since we have found that the rate of gas recombination is higher in this region than it is above 1.41 or in the range 1.33 to 1.29. The electrolyte volume we have found needs to be related critically to the capacity of the cell in order to achieve the best performance for the cell. Thus if too much electrolyte is present gas recombination may be suppressed but if too little is present the capacity of the cell will be restricted by insufficient electrolyte.

We thus prefer to use less than 10 mls of electrolyte per amphere hour of capacity and desireably 8.5 to 9.5 mls/Ahr.

The cell of this embodiment, that shown in FIGS. 6 to 8 is assembled as follows.

The electrode supports are stamped out from the alloy sheet, expanded, pasted and then the positive is enclosed within the separator envelope of weldable fabric with the channels 150 transverse to the length of the electrode strip e.g. up and down in the assembled battery. The edges of the sheath are then welded at the ends 137 and at the top edge 138 between the lugs 140 as indicated by the weld lines 160.

The sheathed positive is then laid over the negative and the assembly coiled to that the negative is on the outside face of the coil. The coil is then wrapped in the band 120 of separator material and secured by the band being welded to itself where it overlaps as indicated by the weld line 161 (FIG. 6).

A coil of separator material 122 is similarly wound or cut from a larger coil and its outer end secured by welding as indicated by the weld line 162 (FIG. 6).

A similar coil 133 of separator material or glass fibre material having an annular shape with an open centre is also produced for location in the dish 130. A metal (or structural plastics) container 115 in which the electrode and separator assembly is a snug fit is provided. The coil 122 is placed in the bottom of the container, the electrode assembly slid in above it and the bars 143 and 147 with their upstanding lugs 144 and 148 burnt into place e.g. using a 98% lead 2% tin solder which we have found particularly effective with our preferred lead calcium tin alloys.

The vent assembly 126 is then placed in position with the bottom end 125 in the central opening 124 of the electrode assembly and the lugs 144 and 148 extending up through tight fitting holes in the dish 130. The annulus 133 is then slid into the dish 130 over the lugs.

The lugs 148 is bent over and spot i.e. to the container 115. The cell is then flooded with electrolyte and electrolytically formed. The electrode assembly and reservoir 122 is then subjected to vacuum to draw off any gases in the pores of the structure and ensure that the pore volume $X+Y+Z+W$ is filled with electrolyte.

The cell is then inverted and allowed to drain under gravity.

The cell then has the cover 127 placed on the vent assembly 126 and the lug 144 bent over and spot welded to the cover 116 which is secured in position in the top of the container.

The cell is then ready for use.

FIGS. 9 to 12 are photomicrographs of the preferred separator material described above for the sheaths 112 and 170. They are scanning electron photomicrographs. A scale is given beside each Figure.

The photomicrographs were prepared by taking a portion of the sheet and then directing a stream of electrons on to the surface at 45° C and collecting the electrons reflected from the surface also at 45° C. The surface was first coated with a thin metallic reflecting layer as is conventional in preparing samples for electron photomicrography. It will be appreciated that the depth of focus of such photographs is very much greater than in optical photography and thus that in effect one is liable to see into the voids and cavities.

The material shown in FIGS. 9 to 12 is a melded polyester fibre fabric weighing 180 grams per square meter.

FIG. 9 is a plan view at 115 fold magnification of an uncompressed region 151. The fibres are 17 to 20 microns in diameter. As can be seen the fibres are of substantial length e.g. of the order of 1200 microns such as the fibre 210, or 600 microns e.g., the fibre 211.

Thus the ratio of fibre diameter to fibre length is typically in the range 1:30 to 1:60. As can be seen substantial open spaces are left between fibres. These gaps are many times the diameter of the fibres.

FIG. 10 shows a larger magnification (550 fold) view of an uncompressed portion 151 of the material.

FIGS. 11 and 12 show plan views (at 210 fold and 555 fold magnification) of one of the compressed regions 150. As can be seen the fibres are not fused into an impermeable sheet but are somewhat flattened e.g. to 30 or 40 microns across in the plane of the sheet and fused into solid regions. The gaps between fibres are now generally less than the cross-sections of the fibres.

According to another aspect of the invention an electrochemical cell has its positive and negative electrodes separated by separator material comprising a non woven fibrous material fibres of which are fused to other fibres, substantially all of the fibres being fused to at least one other fibre, the material being 0.1 to 1 mm thick and having a permeability to air of 0.001 to 0.1 e.g. 0.01 to 0.02 liters per second per cm head of water per square cm. and a tensile strength of at least 0.01 e.g. 0.1 to 1.0 Kgs per sq. mm.

Desirably the fibres are 25 to 150 mms long and have diameter in the range 5 to 50 microns. Those fibres which are fused to other fibres desirably have 1 such fused point of contact with another fibre every 1 to 10 mms of their length thus each fibre may form 2 to 150 e.g. 5 to 30 such fused points of contact.

The material preferably has compressed porous regions which have a thickness D which is related to the thickness C of the remainder of the material in the range of ratios 1:10 to 1:2. The area of the separator occupied by such compressed regions is preferably 10% to 50% of the total plan area of the separator. The compressed regions are preferably provided as strips of equal width spaced equal distances apart and arranged to extend up and down in the cell as assembled. If desired transverse compressed strips can also be provided.

The material typically weighs 100 to 250 grams/sq. meter e.g. 160 to 200 grams per sq. meter and is 0.5 to 0.8 mms thick.

In another aspect of the invention the negative active material paste composition of a lead acid storage battery contains at least 23, 25 or 28 preferably 52 to 57 parts by weight of liquids per 100 parts by weight of the lead content of the active material and at least 0.01 e.g. 0.05 and desirably at least 0.1 to 1.0, e.g. 0.3 to 0.7 or 0.4 to 0.6 parts by weight of silica calculated as $SiO_2$ per 100 parts by weight of active material (calculated as $PbO_2$). The negative active material desirably also includes at least 0.1% of lignin derived lignosulphonate material.

In a further aspect of the invention a sealed lead acid cell is characterised in that it has a ratio of total superficial electrode surface area $A \times N$ (where A is the superficial or plan area of each electrode in sq. cms and N is the number of electrodes) to plate thickness in cms., T, multiplied by cell capacity in Ah, C, of at least 900 cm/Ah. Preferably $A \times N : C \times T$ is in the range 1000 to 1500 cm/Ah.

What we claim is our invention and desire to secure by Letters Patent is:

1. A sealed lead acid cell having electrodes comprising metallic supports which minimize the evolution of hydrogen and which are separated by at least one layer of separator material, the support of the positive electrode or electrodes having positive active material deposited thereon and the support of the negative electrode or electrodes having negative active material deposited thereon, the capacity of the negative electrodes being arranged to be at least as great as the capacity of the positive electrodes, characterized in that the supports for the electrodes are in the form of a mesh or grid affording an integral current collecting strip or bar along at least one edge which will be the top or bottom edge of the structure when assembled in a cell wherein the thickness of the electrodes is less than 3 mm, the thickness of the separator is in the range of 10% to 200% of the thickness of the electrodes and the volume, E, of the electrolyte in the cell in relation to the sum of the pore volume of the separators, X, and the pore volume of the positive and negative active materials, Y, is not greater than $2X + Y$.

2. The sealed lead acid cell of claim 1, in which the positive active material paste composition contains 23 to 57 parts by weight of liquids per 100 parts by weight of the lead content of the active material and from 0.01 to 1.0 parts by weight of silica calculated as $SiO_2$ per 100 parts by weight of active material (calculated as $PbO_2$).

3. The sealed lead acid cell of claim 1, in which the negative active material includes at least 0.1% by weight of lignin derived lignosulphonate material.

4. The sealed lead acid cell of claim 1, in which the separator material comprises a non-woven fibrous material fibres of which are fused to other fibres, substantially all of the fibres being fused to at least one other fibre, the material being 0.1 to 1 mm thick and having a permeability to air of 0.0001 to 0.1 liters per second cm head of water per square cm, and a tensile strength of at least 0.01 kgs per sq. mm.

5. The sealed lead acid cell of claim 4, in which the fibres of the separator material are 25 to 150 mm long and have diameters in the range of 5 to 50 microns.

6. The sealed lead acid cell of claim 4, in which the fibres of the separator which are fused to other fibres have one such fused point of contact with another fibre every 1 to 10 mm of their length.

7. The sealed lead acid cell of claim 4, in which the separator material weighs 100 to 250 grams/sq meter as is 0.5 to 0.8 mm thick.

8. The sealed lead acid cell of claim 1, in which the separator material has compressed porous regions having a thickness D which is related to the thickness C of the remainder of the material in the range of ratios 1:10 to 1:2.

9. The sealed lead acid cell of claim 8, in which the area of the separator occupied by such compressed regions is 10% to 50% of the total plan area of the separator.

10. The sealed lead acid cell of claim 8, in which the compressed regions of the separator material are provided as strips of equal width spaced equal distances apart and arranged to extend up and down in the cell as assembled.

11. The sealed lead acid cell of claim 1, in which the crosssection area of the current collecting bar or strip is in the range 2 to 10 times that of the narrowest mesh elements of the structure.

12. The sealed lead acid cell of claim 1, in which the height of the electrodes and thus the separator is not greater than 150% of the free wicking height, wherein the free wicking height is the height to which 1.38 sp. gr. sulphuric acid rises up a strip of the separator material when said material is suspended vertically above a bath of the acid with 1 cm of the end of the strip below the surface of the acid and the strip and bath are enclosed in a sealed environment at 20° C for 1 hour so as to reach equilibrium.

13. The sealed lead acid cell of claim 1, in which the ratio of the positive and negative active masses combined in grams to the separator height in cms is in the range 13:1 to 30:1.

14. The sealed lead acid cell of claim 1, in which a porous electrolyte retaining reservoir, capable of holding at least 10% of the amount of electrolyte absorbed by the separators, is located in the cell and is arranged in wicking relationship to the separators.

15. The sealed lead acid cell of claim 14, in which the reservoir comprises a pad or coil separator material.

16. The sealed lead acid cell of claim 1, in which the density of the positive active material is in the range 3.2 to 3.8 grams per cc.

17. The sealed lead acid cell of claim 1, in which the specific gravity of the electrolyte is in the range 1.33 to 1.41.

18. The sealed lead acid cell of claim 1, in which the electrode terminals are burnt together with a 98% lead 2% tin solder.

19. A sealed lead acid cell characterized in that it has electrodes comprising metallic supports which minimize the evolution of hydrogen and resist deformation under their own weight, the supports for the electrodes being in the form of a mesh or grid affording an integral current collecting strip or bar along at least one edge which will be the top or bottom edge of the structure when assembled in a cell and which are separated by at least one layer of separator material, the support of the positive electrode or electrodes having positive active material deposited thereon, the deposited active material paste composition consisting of from 23 to 57 parts by weight of liquids per 100 parts by weight of the lead content of the active material and from 0.01 to 1.0 parts by weight of silica calculated as $SiO_2$ per 100 parts by weight of active material (calculated as $PbO_2$) and the support of the negative electrode or electrodes having negative active material deposited thereon, the deposited negative active material being formed from a negative paste active material composition which includes at least 0.1% by weight of lignin derived lignosulphonate material, and in which the capacity of the negative electrodes is arranged to be at least as great as the capacity of the positive electrodes, the thickness of the electrodes is less than 3 mm, the thickness of the separator is in the range of 10% to 200% of the thickness of the electrodes and the volume, E, of electrolyte in the cell in relation to the sum of the pore volume of the separators, X, and the pore volume of the positive and negative active materials, Y, is not greater than $2X + Y$.

* * * * *